United States Patent [19]
Daniels

[11] Patent Number: 5,493,158
[45] Date of Patent: Feb. 20, 1996

[54] MOTOR CAPACITOR BRACKET

[75] Inventor: Nicholas R. Daniels, St. Louis, Mo.

[73] Assignee: Emerson Electric Co., St. Louis, Mo.

[21] Appl. No.: 131,130

[22] Filed: Oct. 4, 1993

[51] Int. Cl.$^6$ .................................................. H02K 11/00
[52] U.S. Cl. .......................................... 310/68 R; 310/72
[58] Field of Search ................................. 310/68 R, 72,
310/89; 361/807, 809, 810, 513, 821, 825;
248/27.3, 604; 24/288

[56] References Cited

U.S. PATENT DOCUMENTS

| | | | |
|---|---|---|---|
| 2,003,031 | 5/1935 | Baker | 310/72 |
| 2,219,495 | 10/1940 | Sleeter et al. | 310/72 |
| 2,253,405 | 8/1941 | Veinott | 310/72 |
| 2,460,903 | 2/1949 | Peck | 361/513 |
| 2,683,824 | 7/1954 | Carville et al. | 310/72 |
| 3,047,648 | 7/1962 | Mowatt | 361/807 |
| 3,210,457 | 10/1965 | Hancock et al. | 310/72 |
| 3,395,298 | 7/1968 | Shifley | 310/72 |
| 3,490,820 | 1/1970 | Lewis | 310/72 |
| 4,434,537 | 3/1984 | Bean et al. | 248/27.3 |
| 4,618,915 | 10/1986 | Bury | 361/760 |
| 5,245,237 | 9/1993 | Fisher et al. | 310/89 |

FOREIGN PATENT DOCUMENTS 693208  6/1953  United Kingdom ................. 310/68 R Primary Examiner—Clayton E. LaBalle
Attorney, Agent, or Firm—Polster, Lieder, Woodruff & Lucchesi

[57] ABSTRACT

A bracket of the present invention is for use with a capacitor motor having a stator and at least one end shield. The motor end shield has a side wall the bottom of which is spaced axially upwardly and radially outwardly from an axially outer face of the stator to define a gap. The bracket has a base, a pair of legs extending upwardly from the base to snappingly receive the capacitor, and a tab which is received in the gap to secure the bracket to the motor without the use of fasteners.

24 Claims, 2 Drawing Sheets 5,493,158

MOTOR CAPACITOR BRACKET

BACKGROUND OF THE INVENTION

This invention relates to motor capacitor brackets, and in particular, to a capacitor bracket that needs no fasteners.

The capacitor of a capacitor motor, for example, is conventionally mounted to the outside of a motor by a bracket. Capacitor brackets have been secured to the top of motor end shields with and without fasteners, as shown in U.S. Pat. Nos. 3,490,820 and 3,395,298. The brackets however, can be designed to be more easily attached to the motor to make assembly of the capacitor motor easier. In particular, it is conventional to use threaded fasteners and associated hardware to mount the capacitor to the motor. This is at best inconvenient to assemble and expensive in the manufacturing process. Further, certain motor applications do not lend themselves to easy mounting of the capacitor structure.

SUMMARY OF THE INVENTION

One object of the present invention is to provide a bracket for the capacitor of the capacitor motor.

Another object is to provide such a bracket which is easily applied to the motor.

A third object is to provide such a bracket which may be secured to the motor without fasteners.

These and other objects will be apparent to those skilled in the art in light of the following disclosure and accompanying drawings.

Briefly stated, a bracket of the present invention is for use with a capacitor motor having a stator and an end shield. The motor end shield has a side wall the bottom of which is spaced axially upwardly and radially outwardly from an axially outer face of the stator to define a gap. The bracket has a base, a pair of legs extending upwardly from the base to snappingly receive the capacitor, and a tab which is received in the gap to secure the bracket to the motor without the use of fasteners. The tab has an upper axially outer portion which is received against the endshield wall bottom and a lower, axially inner portion which is received against the stator face to provide a snug fit (i.e., a force fit) of the tab in the gap to ensure that the bracket is positionally fixed on the motor. The tab is offset from the bracket legs by an arm which extends perpendicularly to the bracket legs. The tab extends perpendicularly to the arm and is received in substantially the full length of the gap.

DESCRIPTION OF THE PREFERRED EMBODIMENT

Figure 1:
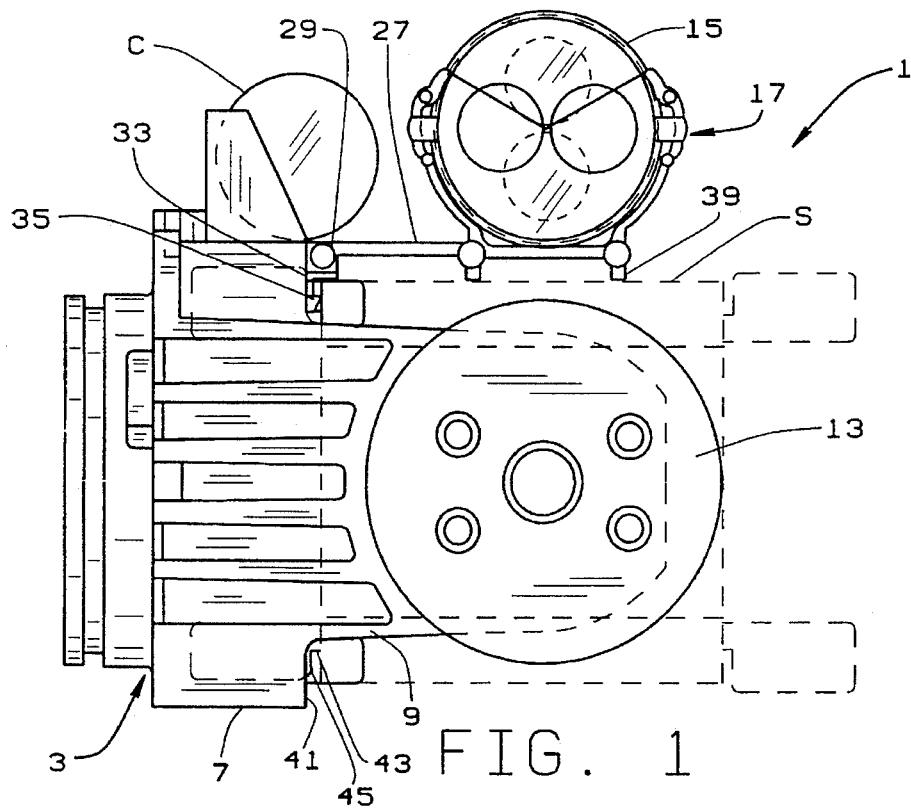
FIG. 1 is a side elevational view of a capacitor start motor having a capacitor bracket of the present invention.
Figure 2:
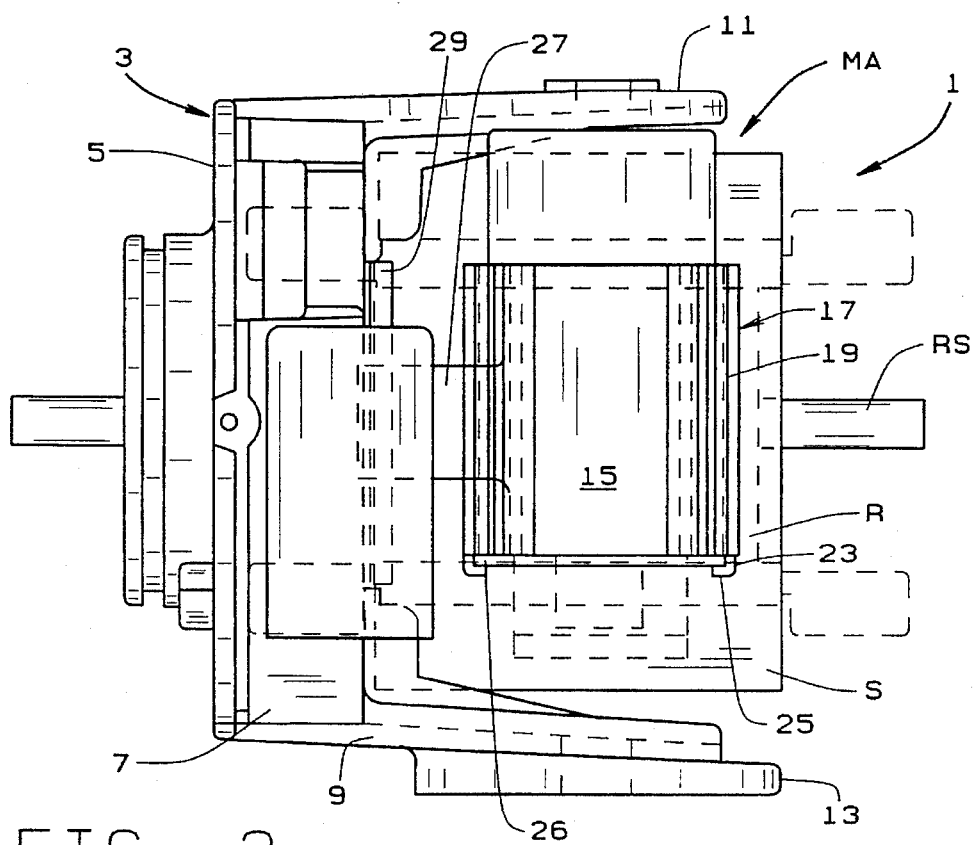
FIG. 2 is a top plan view of the motor.
Figure 3:
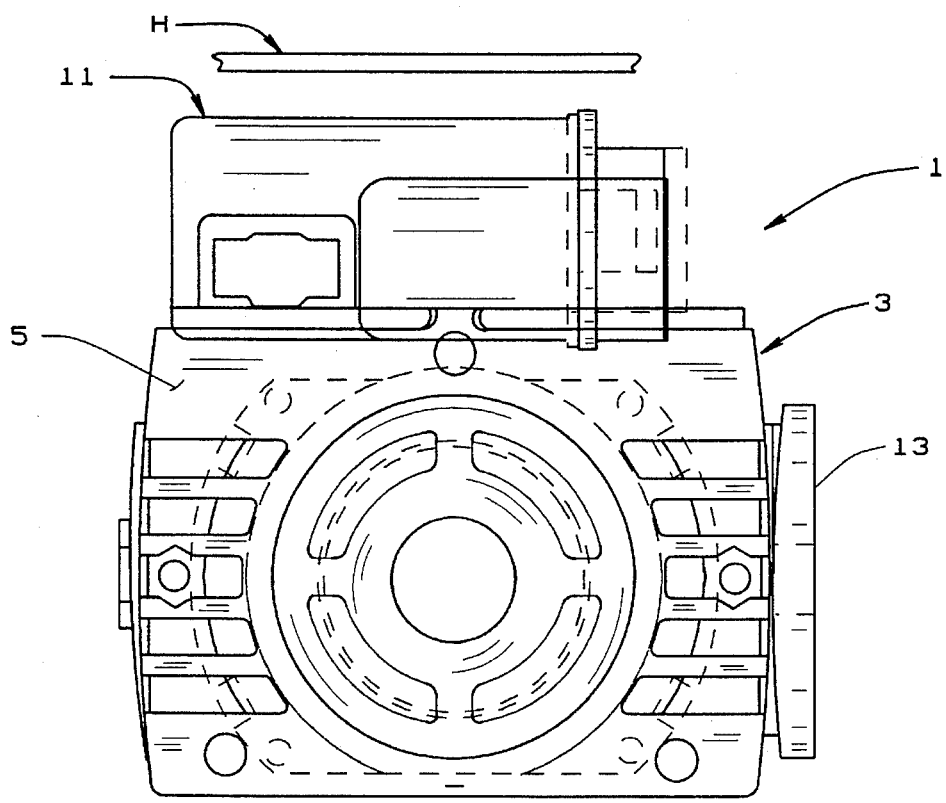
FIG. 3 is a front plan view of the motor.

A capacitor motor 1 is shown in generally in FIGS. 1–3. Motor 1 includes a motor assembly MA having a stator S, rotor R, shown in phantom, and a rotor shaft RS. Motor assembly MA is covered at one end by an endshield 3. Although not shown for the sake of clarity, the other end of motor assembly MA is also covered by an endshield. Endshield 3 has a top or outer axial end 5 which is generally rectangular in plan as seen in FIG. 3. A circumferential wall 7 extends from top 5. Two extensions 9 and 11 extend from wall 7 on opposite sides of motor assembly MA to partially cover stator S. Extension 9 has a mount 13 to mount the motor to a device, such as an arm of the radial arm saw. A capacitor 15 is secured to motor 1 with a capacitor bracket 17 of the present invention. Although the bracket is described for use with a capacitor, it will be understood that the inventive concept of the present invention could be used to secure other motor components to a motor.

Figure 4:
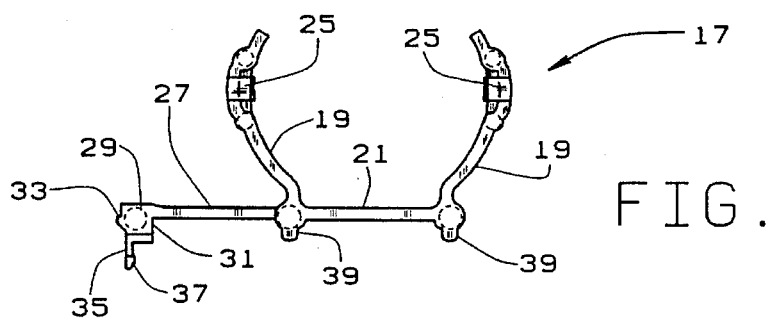
FIG. 4 is an end elevational view of the capacitor bracket of the present invention.
Figure 5:
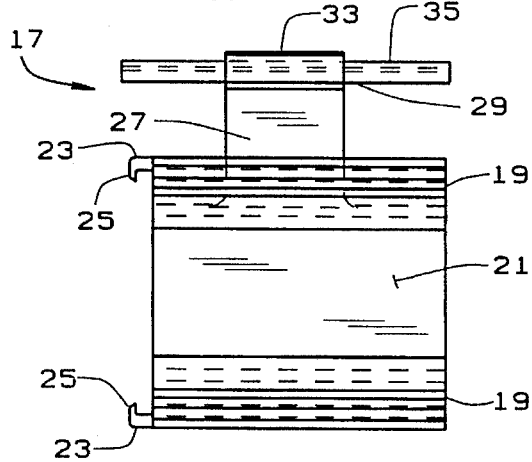
FIG. 5 is a top plan view of the bracket.
Figure 6:
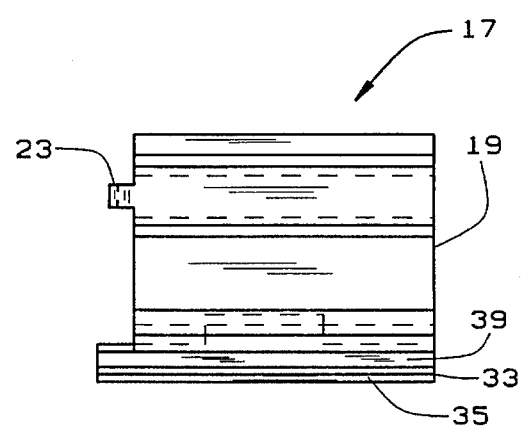
FIG. 6 is a side elevational view of the bracket.

Bracket 17 is shown more clearly in FIGS. 4–6. Bracket 17 has a pair of spaced apart legs 19 connected by a base or web 21. Legs 19 are sized and shaped to receive capacitor 15 in a snap fit. Preferably, legs 19 are generally arcuate in shape. Legs 19 are semiflexible, and bracket 17 receives capacitor 15 by simply pressing capacitor 15 in between legs 19. Legs 19 will expand to receive capacitor 15 and then snap around capacitor 15 as its widest diameter passes the top of legs 19. The legs are sized to encase the capacitor sufficiently to prevent vertical movement of the capacitor with respect to the bracket. Preferably, the top of the legs extend more than half way up the capacitor body, i.e. the height of the legs is greater than the radius of the capacitor's body.

Each leg 19 has an arm 23 having an inwardly directed finger 25 which prevents capacitor 15 from sliding axially in bracket 15. Capacitor 15 has an end plate which extends slightly beyond the cylindrical surface of the capacitor to define a lip 26. Arm 23 is sufficiently long so that capacitor lip 26 can be snuggly placed between the inside of finger 25 and the outer edge of bracket legs 19. The capture of the lip 26 between finger 25 and leg 19 prevents axial movement of the capacitor. Thus, the capacitor is restrained from both vertical and axial movement by the bracket.

An arm 27 extends outwardly from base 21, generally perpendicularly to leg 19. Arm 27 is offset from the center of arm 19. The free end 29 of arm 27 is generally square in side elevation and defines an inner step 31 with arm 27. A knob 33 extends outwardly from an outer end of free end 29. A tab 35 extends downwardly from free end 29, slightly inwardly of knob 33. Tab 35 extends perpendicularly from arm 27 to be substantially parallel to bracket legs 19. Tab 35 is slightly longer than leg 19 and has an end which is substantially even with an end of legs 19 and another end which extends beyond legs 19. Tab 35 has an inwardly directed protrusion 37 at the bottom thereof. Legs 39 extend downwardly from base 21 a distance sufficient for the bottom of legs 39 to be substantially even with the bottom of arm free end 29.

Returning to FIGS. 1–3, the end shield wall 7 has a bottom 41 which is axially and radially spaced from a face 43 of stator S to define a gap 45 between the stator S and the end shield wall 7. Bracket 17 is secured to the motor assembly MA by inserting tab 35 into gap 45. The free end 29 of arm 27 and tab 35 are sized and shaped so that free end knob 33 butts against the bottom 41 of wall 7 and protrusion 37 butts against surface 43 of stator S. This creates a snap or other attaching fit which holds bracket 17 to motor assembly MA to prevent bracket 17 from moving with respect to motor assembly MA under normal use conditions. Bracket 17 is positioned to be over stator S, with the capacitor 15 being substantially perpendicular to rotor shaft RS. Legs 39 rest on stator S and are sized to ensure that bracket 17 is substantially level on motor assembly MA. As can be seen, the motor shown in FIG. 1 has a second capacitor C. The extension 27 of bracket 17 additionally serves to space the two capacitors apart so that they do not interfere with one another. If the capacitor C were not present, extension 27 may not be needed.

As seen in FIG. 3, the capacitor is preferably enclosed in housing H, shown partly broken away, to protect the capacitor from the ambient environment and to prevent exposure of current carrying wires and connectors. Housing H also serves to restrain the capacitor to limited upward movement. Housing H is preferably the housing disclosed in my copending application Ser. No. 118967/08, filed Sep. 9, 1993, entitled "Enclosure Interlock System", which issued as U.S. Pat. No. 5,357,161, and which is incorporated herein by reference.

Bracket 17, as can be appreciated, is easily applied to the motor assembly. Tab 35 is simply inserted into the slot. The force or snap fit is sufficiently tight to hold the bracket and capacitor against movement along the stator with respect to the motor assembly under normal use conditions. The legs 19 provide an encapsulating fit sufficiently snug which, with their stops 25, restrain the capacitor from axial movement along bracket 17. The bracket therefor positioningly fixes capacitor 15 on motor assemble MA without the use of any fasteners, such as screws or the like. If the bracket, for some reason, needs to be removed, it can be easily removed by simply lifting up the bracket to pull tab 35 out of groove 45.

The foregoing description is set forth for illustrative purposes only. Variations within the scope of the appended claims may be apparent to those skilled in the art. For example, it is not necessary that the tab 35 be longer than the legs 19. The only requirement for the tab's length is that the tab be sufficiently long to hold the capacitor securely in place on the motor during normal use of the motor. Likewise, while certain words of art have been used to describe various fits or attachments, other words of similar import may be used to describe the physical characteristics of the invention without departing from the scope of the appended claims.

I claim:

1. A motor capacitor bracket for a dynamoelectric machine; the dynamoelectric machine having a stator and at least one end shield; the bracket comprising a base, a pair of legs extending upwardly from the base to receive the capacitor in a snap fit, and a tab for attaching the bracket to the dynamoelectric machine without the use of fasteners which are separable from said bracket.

2. A motor capacitor bracket for a dynamoelectric machine; the dynamoelectric machine having a stator and at least one end shield; said endshield having a side wall defining a bottom edge, said bottom edge being spaced axially upwardly and radially outwardly from an axially outer face of the stator to define a gap; the bracket comprising a base, a pair of legs extending upwardly from the base to receive the capacitor in a snap fit, and securing means for attaching the bracket to the dynamoelectric machine; said securing means including a tab which depends from said base and which is received in said gap to attach said bracket to said motor.

3. The motor capacitor bracket of claim 2 wherein said tab has an upper axially outer portion which is received against said endshield wall bottom edge and a lower, axially inner portion which is received against said stator face.

4. The motor capacitor bracket of claim 3 wherein said tab is offset from said bracket legs, said tab being positioned on an arm which extends from one of said bracket legs.

5. The motor capacitor bracket of claim 4 wherein said arm extends substantially perpendicularly to said bracket legs.

6. The motor capacitor bracket of claim 3 wherein said tab extends a length sufficient to retain said bracket to said motor.

7. In combination, a capacitor start motor having an end shield, a stator, and a capacitor, and a capacitor bracket having a base, a pair of upwardly extending legs which snappingly receive said capacitor, and means for attaching the bracket to the motor; said attaching means being integrally formed with said bracket such that said bracket and attaching means form a unitary, one-piece article.

8. In combination, a capacitor start motor having an end shield, a stator, and a capacitor, and a capacitor bracket having a base, a pair of upwardly extending legs which snappingly receive said capacitor, and means for securing the bracket to the motor; said endshield having a side wall defining a bottom edge, the bottom edge being spaced axially upwardly and radially outwardly from an axially outer face of the stator to define a gap; said securing means including a tab which depends from said base and is received in said gap to secure said bracket to said motor.

9. The combination of claim 8 wherein said tab has an upper axially outer portion which is received against said endshield wall bottom and a lower, axially inner portion which is received against said stator face.

10. The combination of claim 9 wherein said tab is offset from said bracket legs, said tab being positioned on an arm which extends away from said bracket legs.

11. The combination of claim 10 wherein said arm extends substantially perpendicularly to said bracket legs.

12. The combination of claim 9 wherein said tab extends substantially a length sufficient to retain said bracket to said motor.

13. A bracket for securing a component to an electrodynamic machine, said bracket including a base;

a pair of legs extending upwardly from said base, said legs being shaped to receive and hold said component therebetween; and a tab operatively connected to said base and extending below said base, said tab operating to attach said bracket to said electrodynamic machine; said tab being received in a gap formed in said electrodynamic machine; said tab being sized to create a force fit with said gap to attach said bracket to said electrodynamic machine.

14. The bracket of claim 13 wherein said tab includes a first projection on one side of said tab extending outwardly and away from said base and a second projection on another side of said tab extending inwardly and towards said base.

15. The bracket of claim 14 wherein said first and second projections are vertically spaced from each other.

16. The bracket of claim 13 wherein said tab extends a majority of the length of said legs.

17. The bracket of claim 16 wherein said tab is longer than said legs.

18. A bracket for securing a component to an electrodynamic machine, said bracket including a base;

a pair of legs extending upwardly from said base, said legs being generally arcuate in shape to receive and hold said component; and a downwardly projecting tab to attach said bracket to said electrodynamic machine; said tab being spaced from said legs, said bracket including an extension arm extending outwardly from said base along one of said arms, said tab extending from said extension arm.

19. A bracket for securing a component to an electrodynamic machine, said bracket including a base;

a pair of legs extending upwardly from said base, said legs being generally arcuate in shape to receive and hold said component, said legs having stops to restrain said component from movement in an axial direction along the length of said bracket, said stops including a finger projecting inwardly from said legs; and a downwardly projecting tab to attach said bracket to said electrodynamic machine.

20. The bracket of claim 19 wherein said bracket includes an arm extending longitudinally from said legs, said finger extending inwardly from said longitudinally extending arm.

21. The bracket of claim 20 wherein said component includes an end plate which extends beyond the body of said component to define a lip, said fingers being spaced from said legs by arms a distance sufficient to capture said lip between said finger and said leg to prevent axial movement of said component.

22. A bracket for holding a capacitor, the capacitor having a body and an end plate which extends beyond the body to define a lip, said bracket having a first leg and a second leg spaced apart by a base, said legs including forwardly extending arms having inwardly directed fingers at the ends thereof, said arms being sufficiently long to capture said capacitor lip between said fingers and said legs to prevent axial movement of said capacitor with respect to said bracket.

23. The capacitor bracket of claim 22 wherein said legs generally conform to the shape of said capacitor, said legs being slightly snappingly flexible to receive said capacitor, said legs being sized sufficiently to encase said capacitor to prevent vertical movement of said capacitor with respect to said bracket.

24. The capacitor bracket of claim 23 wherein said capacitor body is generally cylindrical, said legs extending to a point a height greater than radius of said capacitor.

* * * * *